United States Patent [19]

Plank

[11] Patent Number: 5,577,860
[45] Date of Patent: Nov. 26, 1996

[54] ATTACHMENT DEVICE FOR SECURING STRUCTURAL COMPONENTS TO SHAPED RAILS

[75] Inventor: Wolfgang Plank, Brand, Austria

[73] Assignee: Hilti Aktiengesellschaft, Liechtenstein

[21] Appl. No.: 544,516

[22] Filed: Oct. 18, 1995

[30] Foreign Application Priority Data

Oct. 21, 1994 [DE] Germany ................ 44 37 648.0

[51] Int. Cl.⁶ ........................................ F16B 2/20
[52] U.S. Cl. ................ 403/403; 403/231; 403/22; 403/11; 411/160; 411/531
[58] Field of Search ................ 403/22, 11, 205, 403/231, 403, 402; 411/160, 959, 531

[56] References Cited

U.S. PATENT DOCUMENTS

| 2,639,789 | 5/1953 | Rosenberg | 411/531 X |
| 3,472,542 | 10/1969 | Hart | 403/22 |
| 4,616,950 | 10/1986 | Morris | 403/231 |
| 5,489,173 | 2/1996 | Hofle | 411/85 |

FOREIGN PATENT DOCUMENTS 8003184  1/1982  Netherlands ................ 403/205

Primary Examiner—Anthony Knight
Attorney, Agent, or Firm—Anderson, Kill, Olick PC

[57] ABSTRACT

An attachment device including a cover plate (3) and a fastening element (10) is used for securing a structural component (1) to a solid foundation unit (12). The structural component (1) has an opening (2) formed of a round bore with two symmetrically arranged widening sections (7) located diametrically opposite one another and extending outwardly from the round bore. The cover plate (3) has projections (6) which extend into the widening sections (7).

6 Claims, 2 Drawing Sheets

ATTACHMENT DEVICE FOR SECURING STRUCTURAL COMPONENTS TO SHAPED RAILS

BACKGROUND OF THE INVENTION

The present invention is directed to an attachment device including a cover plate and a fastening element for securing a structural component to a solid foundation unit where the structural component has an opening with a non-circular cross section. The opening is formed of a round bore and two symmetrically arranged widening sections located diametrically opposite one another on opposite sides of the bore. The width of the widening sections measured parallel to the axis of symmetry of the sections increases in the direction outwardly from the round bore. The cover plate at least partially covers the opening and includes a round through passage and projections located diametrically opposite one another and engageable into the widening sections of the opening through the structural component, with the projections each located on a planar surface and on opposite sides of the through passage.

For securing structural components to shaped rails, devices are used, such as disclosed in DE-OS 42 43 185, made up of a fastening element, a rail nut with a non-circular head and a cover plate extending over and at least partially covering a non-circular opening in the component and with projections extending into the opening. To assure a simple and rapid preliminary assembly of the device to other components, the non-circular head of the rail nut is matched to the cross section of the opening in the structural component, so that the rail nut of a threaded connection can be passed in a specific angular position through the opening in the structural component without the necessity of unscrewing the rail nut from the attachment element.

To secure the structural components to a solid foundation unit, the cover plate of a known device can be used so that a fastening element in the shape of a screw or bolt can be guided centrally in the opening. In the cooperation of the attachment element with a dowel element disposed in the foundation unit, a contact pressure force can be developed by the fastening element acting on the structural component through the cover plate. Since the known cover plate protrudes only on two sides beyond the non-circular opening and thus rests only on the component in two regions lying diametrically opposite one another, such a high specific area pressure can develop causing a deformation of the opening in the form of a narrowing down. Further, use of such component along with threaded connections is no longer possible, since the rail nut of the threaded connection cannot pass through the opening.

SUMMARY OF THE INVENTION

Therefore, the primary object of the present invention is to provide an attachment device where the contact pressure developed by the fastening element is transferred to the structural component and is uniformly distributed around the periphery of the opening.

In accordance with the present invention, the exterior contour of the cover plate in the plane of the plate extends beyond the outside configuration of the projections.

Due to the cover plate of the invention, the contact force transferred from the fastening element to the cover plate is uniformly distributed around the periphery of the non-circular opening. An increased specific pressure area is achieved and deformation of the opening is prevented.

To center the cover plate parallel to the axis of symmetry of the widening sections of the opening in the structural component, the cover plate has guides at the planar side cooperating with the structural component.

For limiting manufacturing expenses, these guides are preferably formed by bent side edges of the cover plate which at least partially embrace the structural component.

For displacement of the cover plate relative to the structural component, it is preferable to provide two guides extending parallel to one another.

To provide a preliminary assembly of the cover plate to the structural component, preferably the cover plate has a plug-in part which can be placed in connection with the structural component. Such plug-in part is connected to the cover plate so that it cannot move axially or rotationally and projects into the circular bore of the opening in the structural component. To enable the attachment of the cover plate to the structural component, plug-in part is preferably at least partially flexible parallel to the planar side of the structural component and protrudes in the non-stressed state at last partially beyond the exterior contour of the opening in the structural component.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE PRESENT INVENTION

Figure 1:
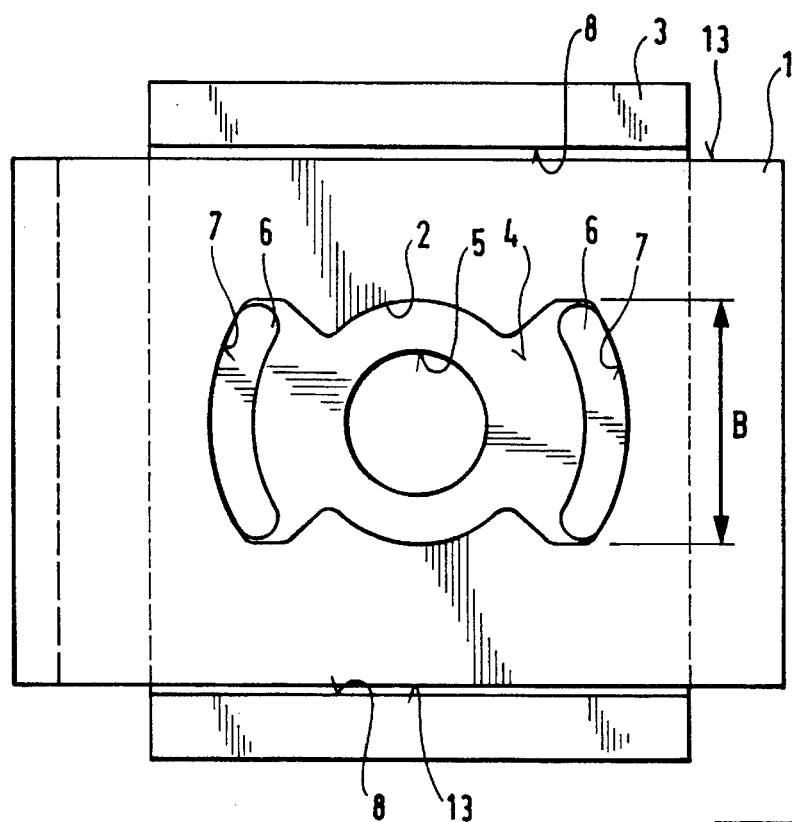
FIG. 1 is a bottom plan view of a cover plate of an attachment device embodying the present invention connected with an angularly shaped structural component.

In FIG. 1 a cover plate 3 of an attachment device is shown connected to an angularly shaped structural component 1 having a circular bore and two widening sections 7 located diametrically opposite one another on opposite sides of the circular bore. The widening sections 7 are arranged symmetrically to one another and have a maximum width B measured parallel to an axis of symmetry of the sections. As can be noted in FIG. 1, the widening sections have an increasing width in the direction outwardly from the circular bore. A cover plate 3 extends over the opening 2 with the exception of the through opening or passage 5 in the cover plate. Further, the cover plate 3 has two projections 6 on a planar side 4 of the cover plate, that is the side facing downwardly in FIG. 2. The projections 6 are located diametrically opposite one another and have a contour extending perpendicularly to the planar side 4 corresponding to at least one part of the peripheral contour of the widening section 7 of the opening 2 in the structural component 1.

The planar side 4 of the cover plate 3 from which the projections 6 protrude, has projecting edge portions or guides 8 cooperating with the structural component 1. The guides 8 extend along the side edges 13 of the structural component 1 located diametrically opposite one another.

Figure 2:
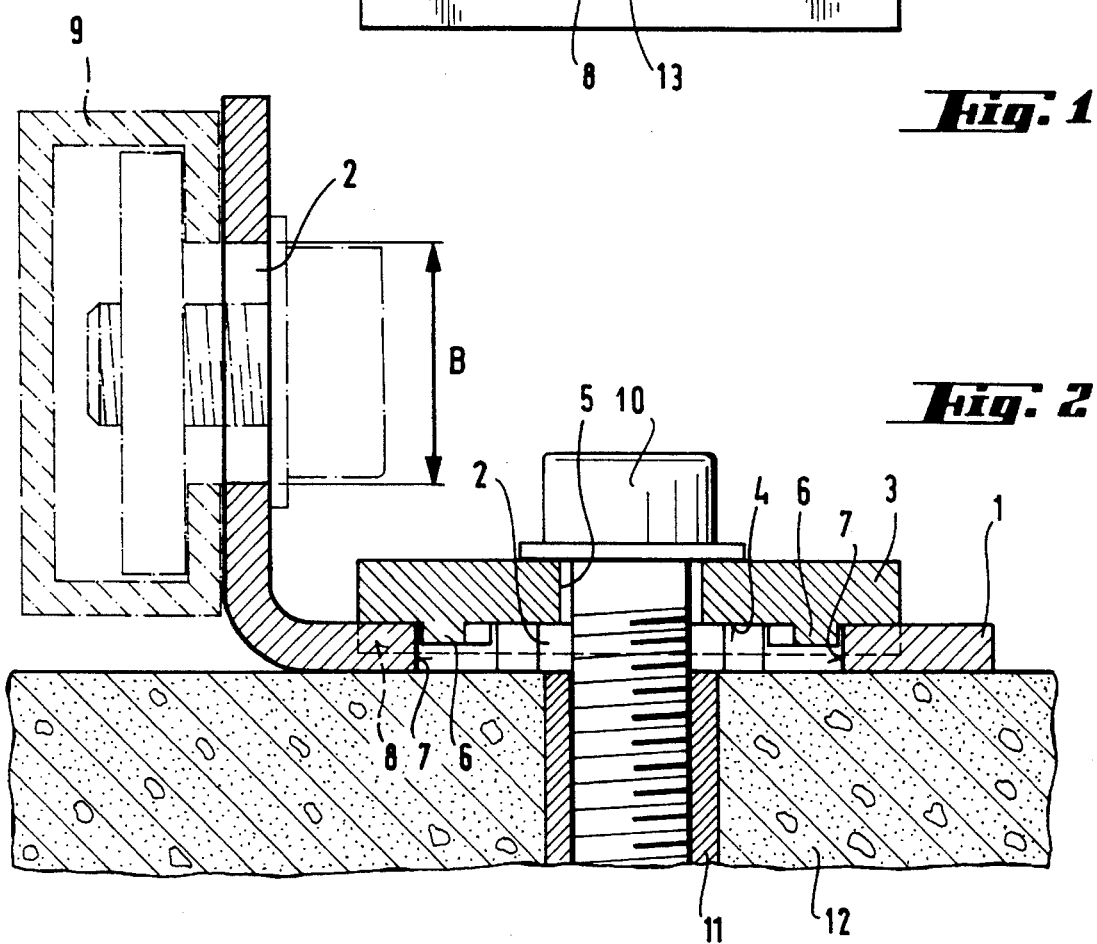
FIG. 2 is a sectional view of a complete attachment device connected to the structural component, a solid foundation unit and a profiled rail.

In FIG. 2 a complete attachment device is shown with the cover plate 3 and a fastening element 10 connected to the structural component 1. One leg of the angular structural component 1 is secured to a solid foundation unit 12 and the other leg is connected to shaped rail 9, shown in phantom The fastening element 10, in the form of a screw or bolt, extends through the passage 5 in the cover plate 3 and the circular bore of the opening 2 of the leg of the angularly shaped component 1 bearing against the foundation unit 12. The fastening element 10 extends into a dowel element 11 located in the foundation unit 12.

The projections 6 located on the planar side 4 of the cover plate 3 extend at least partially into the widening sections 7 in the structural component. The head of the fastening element 10 bears, with the interposition of shims, on the planar side of the cover plate facing upwardly in FIG. 2, that is the side opposite the planar side 4 carrying the projection 6. The structural component 1 is connected to a shaped rail 9, shown in phantom, by means of a screw or bolt, also shown in phantom. A rail nut, with a screw or bolt connection, has a non-circular head corresponding to the opening 2 in the structural component 1.

Figure 3:
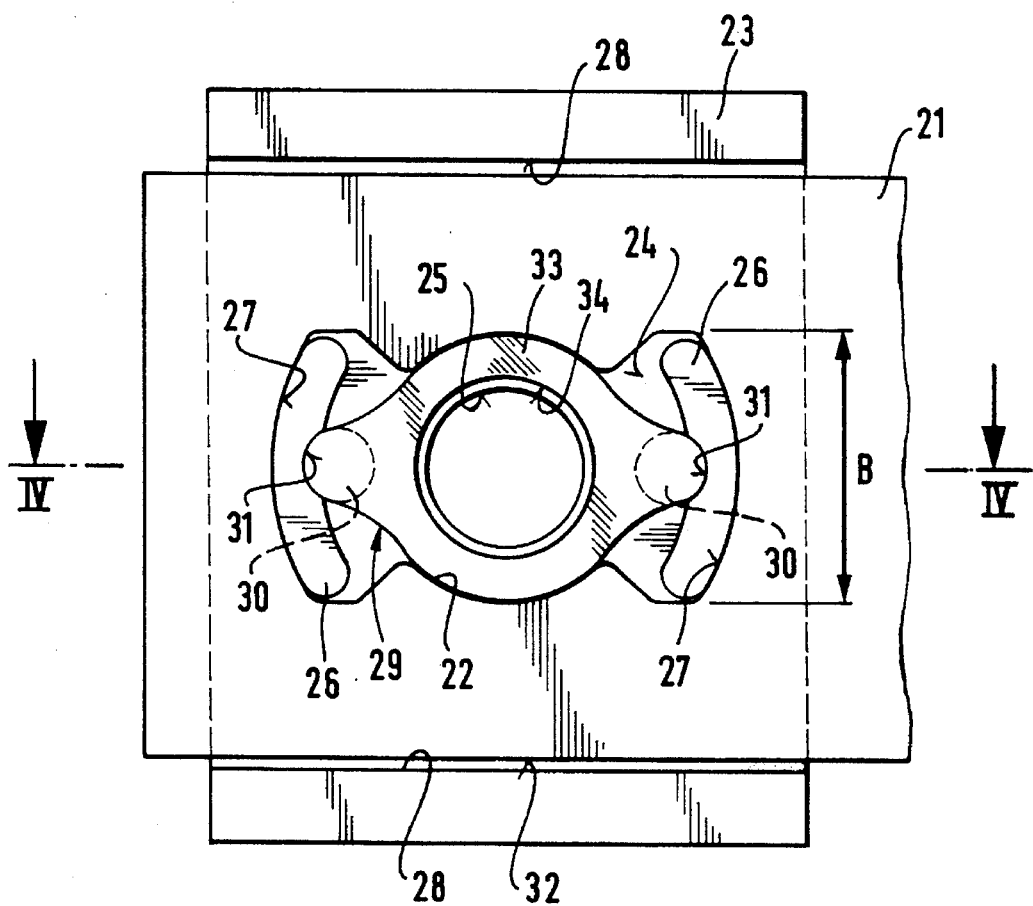
FIG. 3 is another embodiment of the present invention with a cover plate and plug-in part connected with a bar shaped structural component.
Figure 4:
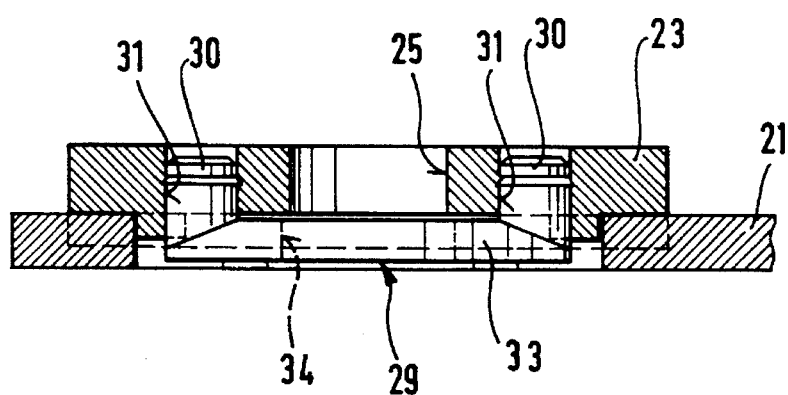
FIG. 4 is a sectional view taken along the line IV—IV in FIG. 3.

In FIGS. 3 and 4 another embodiment of the present invention is illustrated comprising a cover plate 23 and a plug-in part 29 of another attachment device shown partly in FIG. 4. The cover plate 23 rests on a structural component 21 and has a planar side 24 from which projections 26 and side edge guides 28 extend with the side edge guides being in the form of bent edge sections. The bent edge sections at least partially grip over the side edges 32 of the structural component 21. The projections 26, extending outwardly from the planar side 24, are located diametrically opposite one another with the outside shape of the projections 26 extending perpendicularly to the planar side 24 of the cover plate 23 conforming to at least a portion of the radially outer periphery of the widening sections 27 of the opening 22. The widening sections 27 extend outwardly from a circular bore of the opening 22 in the structural component 21 with the widening sections located diametrically apart on opposite sides of the circular bore. The widening sections 27 have a maximum width B measured parallel to the axis of symmetry of the widening sections. As can be noted in FIG. 3, the widening sections increase in width in the direction outwardly from the circular bore.

The plug-in part 29 connected to the cover plate 23 is formed of an elastic ring 33 with two pin-shaped elements 30 located diametrically opposite one another and extending upwardly from the elastic ring 33 as shown in FIG. 4. A central through bore 34 of the ring 33 corresponds approximately to the size of the circular passage 25 in the cover plate 23. The pin-shaped connecting elements 30 extend into matching receiving bores 31 in the cover plate with the bores 31 located diametrically opposite one another. Ribs projecting radially inwardly into the receiving bore 31 engage in recesses in the pin-shaped connecting elements 30 for interconnecting the plug-in part 29 and the cover plate 23. This arrangement of the receiving bores 31 and the pin-shaped connecting elements 30 afford a snap in axial connection of the plug-in part 29 with the cover plate 23.

The outside contour of the elastic ring 33 extends in the unstressed state beyond the outside shape of the circular bore of the opening in 22 and is compressed radially when it is inserted into the circular bore. As a result prestress is developed which produces friction at the inside surface of the circular bore. Such friction is sufficient to afford a preliminary installation of the cover plate 23 on the structural component 21.

While specific embodiments of the invention have been shown and described in detail to illustrate the inventive principles, it will be understood that the invention may be embodied otherwise without departing from such principles.

I claim:

1. Attachment device comprising a fastening element (10) and a cover plate (3, 23) for securing a structural component (1, 21) having an opening with a center axis extending therethrough and an out-of-round cross section extending transversely of the center axis and formed of a circular bore and two widening sections (7, 27) located diametrically opposite one another relative to the center axis and extending radially outwardly from said circular bore, said widening section (7, 27) having an axis of symmetry extending through said center axis and each having a width (B) measured parallel to the axis of symmetry increasing in the radially outward direction, said cover plate (3, 23) at last partially covers said opening (2, 22), said cover plate (3, 23) has a circular through passage (5, 25) extending therethrough from a first side to an oppositely facing planar second side directed toward said opening (2, 22), said cover plate having two projections (6, 26) located diametrically opposite one another on the opposite sides of said axis of symmetry and extending from the second side of said cover plate in the direction of the center axis of said opening (2, 22) into the widening sections (7, 27), said projections (6) having an outside contour, said cover plate (3, 23) extending transversely of the center axis beyond the outside contour of said projections (6) in a plane of the said second side.

2. Attachment device, as set forth in claim 1, wherein said cover plate (3, 23) comprises side guides (8, 28) extending outwardly from said second side (4, 24) of said cover plate and cooperating with said structural component (1, 21).

3. Attachment device, as set forth in claim 2, wherein said side guides (8, 28) being formed by bent side edges of said cover plates (3, 23).

4. Attachment device, as set forth in claim 2 or 3, wherein said side guide (8, 28) of said cover plate (3, 23) extend parallel to one another.

5. Attachment device, as set forth in claim 4, wherein said cover plate (23) having a plug-in part (29) for connection to said structural component (21).

6. Attachment device, as set forth in claim 5, wherein said plug-in part (29) is at least partially flexible parallel to said second side (24) and in an unstressed state protrudes at least partially outwardly from an outside contour of the opening (22) in the structural component (21).

* * * * *